United States Patent
Matsubara et al.

(10) Patent No.: US 9,463,688 B2
(45) Date of Patent: Oct. 11, 2016

(54) DRIVE CONTROL DEVICE FOR HYBRID VEHICLE

(75) Inventors: Tomoya Matsubara, Nagoya (JP); Kazuyuki Shiiba, Miyoshi (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 224 days.

(21) Appl. No.: 14/388,019

(22) PCT Filed: Mar. 26, 2012

(86) PCT No.: PCT/JP2012/057820
§ 371 (c)(1), (2), (4) Date: Nov. 19, 2014

(87) PCT Pub. No.: WO2013/145101
PCT Pub. Date: Oct. 3, 2013

(65) Prior Publication Data
US 2015/0336569 A1   Nov. 26, 2015

(51) Int. Cl.
| | |
|---|---|
| B60W 20/00 | (2016.01) |
| B60L 11/00 | (2006.01) |
| B60K 6/387 | (2007.10) |
| B60W 10/06 | (2006.01) |
| B60W 10/02 | (2006.01) |
| B60W 10/196 | (2012.01) |

(Continued)

(52) U.S. Cl.
CPC ............ *B60K 6/387* (2013.01); *B60K 6/445* (2013.01); *B60W 10/02* (2013.01); *B60W 10/06* (2013.01); *B60W 10/08* (2013.01); *B60W 10/196* (2013.01); *B60W 20/40* (2013.01); *B60K 2006/381* (2013.01); *B60W 2510/06* (2013.01); *B60W 2710/021* (2013.01); *B60W 2710/0644* (2013.01); *B60W 2710/081* (2013.01); *B60W 2710/18* (2013.01); *Y02T 10/6239* (2013.01); *Y02T 10/7258* (2013.01); *Y10S 903/93* (2013.01)

(58) Field of Classification Search
CPC combination set(s) only.
See application file for complete search history.

(56) References Cited

U.S. PATENT DOCUMENTS

| | | | |
|---|---|---|---|
| 2005/0255968 A1 | 11/2005 | Sah et al. | |
| 2009/0011895 A1* | 1/2009 | Tabata | B60K 6/445 477/3 |

(Continued)

FOREIGN PATENT DOCUMENTS

| | | |
|---|---|---|
| EP | 0839683 A2 | 5/1998 |
| JP | 2005-199942 A | 7/2005 |

(Continued)

*Primary Examiner* — Yonel Beaulieu
(74) *Attorney, Agent, or Firm* — Sughrue Mion, PLLC

(57) ABSTRACT

A drive control device for a hybrid vehicle is provided with a differential device including four rotary elements; and an engine, first and second electric motors and an output rotary member which are respectively connected to the four rotary elements. One of the four rotary elements is constituted by a rotary component of a first differential mechanism and a rotary component of a second differential mechanism selectively connected through a clutch, and one of the rotary components is selectively fixed to a stationary member through a brake. The drive control device stops a rotation of the engine by using the clutch or the brake when an engine speed is reduced for making a shift from an engine drive mode in which the engine is driven for running to a motor drive mode; engages the clutch or the brake to reduce the engine speed to zero after the first electric motor is used for reducing the engine speed. The first electric motor provides a feedback control such that the engine speed is reduced toward a target speed set in advance to a value larger than zero.

3 Claims, 14 Drawing Sheets

(51) Int. Cl.
    *B60K 6/445*    (2007.10)
    *B60W 10/08*    (2006.01)
    *B60K 6/38*     (2007.10)

(56) References Cited

U.S. PATENT DOCUMENTS

| | | | |
|---|---|---|---|
| 2009/0075779 A1 | 3/2009 | Kumazaki et al. | |
| 2010/0048353 A1* | 2/2010 | Iwase | B60K 6/445 477/167 |
| 2010/0137091 A1 | 6/2010 | Park et al. | |
| 2013/0041533 A1* | 2/2013 | Kim | B60K 6/365 701/22 |
| 2014/0194238 A1 | 7/2014 | Ono et al. | |
| 2015/0051769 A1* | 2/2015 | Maruyama | B60K 6/445 701/22 |
| 2015/0057862 A1* | 2/2015 | Sato | B60K 6/445 701/22 |
| 2015/0087474 A1* | 3/2015 | Matsubara | B60W 20/108 477/3 |
| 2015/0266461 A1* | 9/2015 | Sahashi | B60W 10/08 477/5 |
| 2015/0360681 A1* | 12/2015 | Kanayama | B60W 20/40 701/22 |

FOREIGN PATENT DOCUMENTS

| | | |
|---|---|---|
| JP | 4038183 B2 | 1/2008 |
| JP | 2008-265600 A | 11/2008 |
| JP | 2009-067270 A | 4/2009 |
| WO | 2013/014777 A1 | 1/2013 |

* cited by examiner

|      | BK | CL | MODE |
|------|----|----|------|
| EV-1 | ○  |    | 1    |
| EV-2 | ○  | ○  | 2    |
| HV-1 | ○  |    | 3    |
| HV-2 |    | ○  | 4    |
| HV-3 |    |    | 5    |

DRIVE CONTROL DEVICE FOR HYBRID VEHICLE

CROSS REFERENCE TO RELATED APPLICATIONS

This is a National Stage of International Application No. PCT/JP2012/057820 filed Mar. 26, 2012, the contents of which are incorporated herein by reference in its entirety.

TECHNICAL FIELD

The present invention relates to an improvement of a drive control device for a hybrid vehicle.

BACKGROUND ART

For example, as disclosed in the Patent Document 1, there is known a hybrid vehicle which is provided with a differential mechanism having a first rotary element connected to a first electric motor, a second rotary element connected to an engine, and a third rotary element connected to an output rotary member and connected to a second electric motor through a double reduction gear, and a crankshaft locking device for inhibiting a rotary motion of a crankshaft of the engine, and which can be run in a second motor drive mode in which both of the first and second electric motors are operated as a vehicle drive power source, as well as in an ordinary first motor drive mode in which the second electric motor is operated as the vehicle drive power source.

PRIOR ART DOCUMENT

Patent Document

Patent Document 1: JP-2008-265600 A1

SUMMARY OF THE INVENTION

Problem to be Solved by the Invention

It is considered to configure a hybrid vehicle such that the hybrid vehicle is provided with: a first differential mechanism having a first rotary element connected to a first electric motor, a second rotary element connected to an engine, and a third rotary element connected to an output rotary member; a second differential mechanism which has a first rotary element connected to a second electric motor, a second rotary element and a third rotary element, and in which one of the second and third rotary elements is connected to the third rotary element of the first differential mechanism; a clutch for selectively connecting the rotary element of the first differential mechanism and the rotary element of the second differential mechanism to each other; and a brake for selectively fixing the rotary element of the second differential mechanism to a stationary member and that the hybrid vehicle can be run in a plurality of drive modes depending on combination of engagement operations of the clutch and the brake.

In the process of stopping operation of the engine and stopping the rotation so as to make a shift from, for example, an engine drive mode to a motor drive mode in a hybrid vehicle capable of running in a plurality of drive modes as described above, it is considered to provide a feedback control such that an engine speed, that is an operating speed of the engine, a rotation speed of the engine is actively reduced by the first electric motor toward a target speed set to zero so as to allow the engine to quickly pass through a resonance band in which the engine speed causes resonance of a drive system.

However, since a time period for reducing the engine speed through the feedback control using the first electric motor is relatively short, if it is attempted to allow the engine to quickly pass through the resonance band of the engine speed, overshooting may disadvantageously occur and cause the engine to reversely rotate when the engine speed is brought closer to zero through the feedback control.

The present invention was made in view of the background art described above. It is therefore an object of the present invention to provide a drive control device for a hybrid vehicle, which prevents reverse rotation of an engine when an engine speed is stopped for making a shift from an engine drive mode to a motor drive mode.

Means for Achieving the Object

As a result of intensive studies in view of the background art described above, the present inventors found out that the hybrid vehicle capable of running in the plurality of the drive modes can stop the engine without using the first electric motor by placing the brake or the clutch in an engaged state. The present invention was conceived based on such knowledge.

That is, the present invention provides a drive control device for a hybrid vehicle provided with: (a) a first differential mechanism and a second differential mechanism which have four rotary elements as a whole; and an engine, a first electric motor, a second electric motor and an output rotary member which are respectively connected to said four rotary elements, and wherein one of said four rotary elements is constituted by the rotary element of said first differential mechanism and the rotary element of said second differential mechanism which are, selectively connected to each other through a clutch, and one of the rotary elements of said first and second differential mechanisms which are selectively connected to each other through said clutch is selectively fixed to a stationary member through a brake, said drive control device being characterized by: (b) stopping a rotation of the engine by using the clutch or the brake when an engine speed is reduced for making a shift from an engine drive mode in which the engine is driven for running to a motor drive mode.

Advantages of the Invention

According to the drive control device for a hybrid vehicle of the present invention, when the engine speed is reduced for making a shift from an engine drive mode in which the engine is driven for running to a motor drive mode, the clutch or the brake is used for stopping the rotation of the engine. Consequently, when the engine speed at least reaches a value close to zero, the brake or the clutch is placed in the engaged state to stop the engine speed and, thus, the engine speed is reduced without reverse rotation of the engine.

Preferably, after the first electric motor is used for reducing the engine speed, the clutch or the brake is engaged to reduce the engine speed to zero. Consequently, as compared to when the engine is stopped by only the clutch or the brake, the abrasion of the clutch or the brake is preferably suppressed and the durability of the clutch or the brake is improved.

Preferably, the first electric motor provides a feedback control such that the engine speed is reduced toward a target speed set in advance to a value larger than zero. Consequently, since the feedback control by the electric motor is terminated before the engine stops and a switch is made such that the clutch or brake is placed in the engaged state to reduce the engine speed, the sensitivity or followability of the feedback control is enhanced so as to allow the engine to relatively quickly pass through the resonance band of the engine speed and the reverse rotation of the engine is preferably prevented even when the engine speed overshoots the target speed.

Preferably, a drive mode is shifted from the engine drive mode in which the brake is placed in an engaged state while the clutch is placed in a released state, to the motor drive mode in which the brake and the clutch are placed in an engaged state. Consequently, by placing the clutch in the engaged state, the rotary element connected to the engine is relatively non-rotatably connected to the stationary member and the engine speed is reduced to stop the rotation, and the motor running can be performed in this engaged state without change.

Preferably, said first differential mechanism is provided with a first rotary element connected to said first electric motor, a second rotary element connected to said engine, and a third rotary element connected to said output rotary member, while said second differential mechanism is provided with a first rotary element connected to said second electric motor, a second rotary element, and a third rotary element, one of the second and third rotary elements being connected to the third rotary element of said first differential mechanism, and said clutch is configured to selectively connect the second rotary element of said first differential mechanism, and the other of the second and third rotary elements of said second differential mechanism which is not connected to the third rotary element of said first differential mechanism, to each other, while said brake is configured to selectively fix the other of the second and third rotary elements of said second differential mechanism which is not connected to the third rotary element of said first differential mechanism, to the stationary member. Consequently, the same effect as the first aspect of the invention is acquired.

MODE FOR CARRYING OUT THE INVENTION

Figure 1:
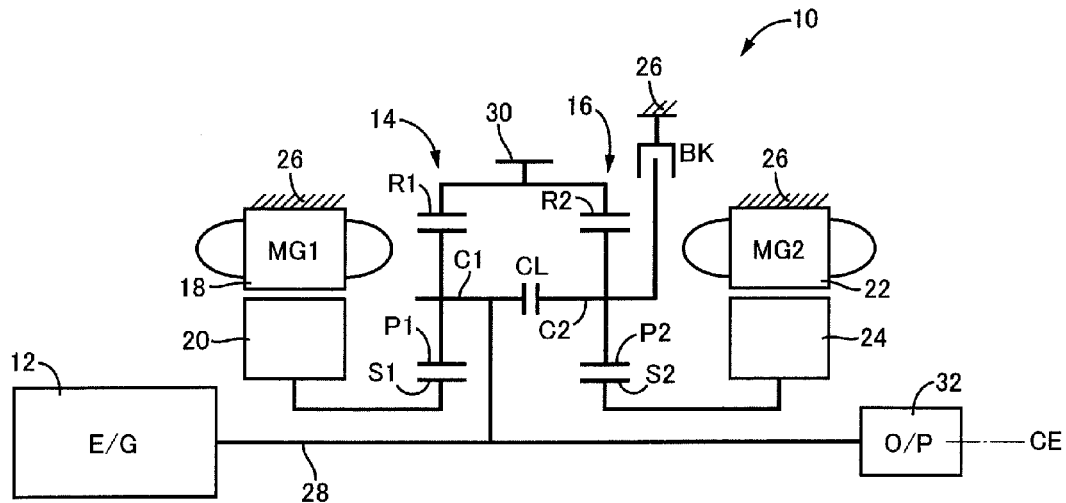
FIG. 1 is a schematic view for explaining an arrangement of a hybrid vehicle drive system to which the present invention is suitably applicable.

According to the present invention, the first and second differential mechanisms as a whole have four rotary elements while the above-described clutch is placed in the engaged state. In one preferred form of the present invention, the first and second differential mechanisms as a whole have four rotary elements while a plurality of clutches, each of which is provided between the rotary elements of the first and second differential mechanisms and which includes the above-described clutch, are placed in their engaged states. In other words, the present invention is suitably applicable to a drive control device for a hybrid vehicle which is provided with the first and second differential mechanisms represented as the four rotary elements indicated in a collinear chart, and the engine, the first electric motor, the second electric motor and the output rotary member which are connected to the respective four rotary elements, and wherein one of the four rotary elements is selectively connected through the above-described clutch to another of the rotary elements of the first differential mechanism and another of the rotary elements of the second differential mechanism, while the rotary element of the first or second differential mechanism to be selectively connected to the above-indicated one rotary element through the clutch is selectively fixed through the above-described brake to the stationary member.

In another preferred form of the present invention, the above-described clutch and brake are hydraulically operated coupling devices operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source while the engine is held at rest include an EV-1 mode to be established in the engaged state of the brake and in the released state of the clutch, and an EV-2 mode to be established in the engaged states of both of the clutch and brake. Further, hybrid drive modes in which the above-described engine is operated while the above-described first and second electric motors are operated to generate a vehicle drive force and/or an electric energy as needed, include an HV-1 mode to be established in the engaged state of the brake and in the released state of the clutch, an HV-2 mode to be established in the released state of the brake and the engaged state of the clutch, and an HV-3 mode to be established in the released states of both of the brake and clutch.

In a further preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which is provided with rotary elements (elements) consisting of: a first rotary element in the form of a sun gear S1; a second rotary element in the form of a carrier C1 supporting a pinion gear P1 such that the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio ρ2 and which is provided with rotary elements (elements) consisting of: a first rotary element in the form of a sun gear S2; a second rotary element in the form of a carrier C2 supporting a pinion gear P2 such that the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

Drive force output from the output gear 30 is transmitted to a pair of left and right drive wheels (not shown) through a differential gear device and axles (not shown), etc. On the other hand, a torque received by the drive wheels from a roadway surface on which the vehicle is running is transmitted (input) from the output gear 30 through the differential gear device and axles, etc to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is operated with an electric energy may be provided in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
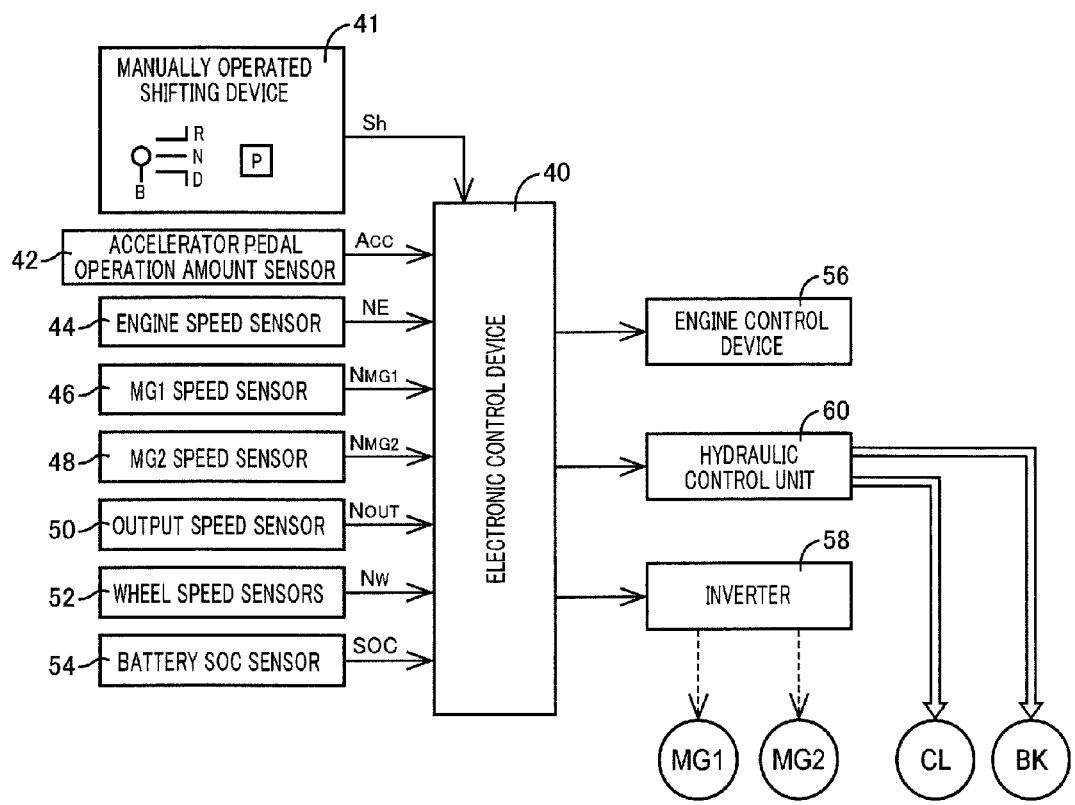
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: a shift position signal Sh generated by a manually operated shifting device 41, which is indicative of a presently selected one of a neutral position, a forward drive position, a reverse drive position, etc.; an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed NE, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of wheel speed sensors 52 indicative of rotating speeds $N_W$ of the drive wheels in the drive system 10; and an output signal of a battery SOC sensor 54 indicative of a stored electric energy amount (state of charge) SOC of a battery not shown.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and MG2 are supplied to and stored in the battery through the inverter 58. Further, the electronic control device 40 applies command signals for controlling the operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of the drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
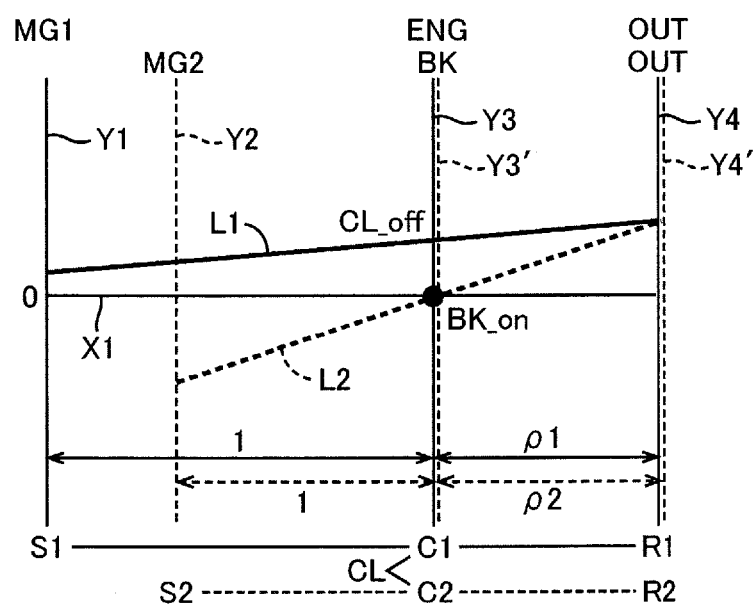
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the EV-1 mode and HV-1 mode of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes "EV-1 mode" and "EV-2 mode" indicated in FIG. 3 are EV drive modes (motor drive modes) in which the engine 12 is held at rest while at least one of the first electric motor MG1 and second electric motor MG2 is used as a vehicle drive power source. The drive modes "HV-1 mode", "HV-2 mode" and "HV-3 mode" are hybrid drive modes (engine drive modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-loaded free state.

As is apparent from FIG. 3, the EV drive modes of the drive system 10 in which the engine 12 is held at rest while at least one of the first electric motor MG1 and second electric motor MG2 is used as the vehicle drive power source consist of: an EV-1 mode (drive mode 1) which is established in the engaged state of the brake BK and in the released state of the clutch CL; and an EV-2 mode (drive mode 2) which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: an HV-1 mode (drive mode 3) which is established in the engaged state of the brake BK and in the released state of the clutch CL; an HV-2 mode (drive mode 4) which is established in the released state of the brake BK and in the engaged state of the clutch CL; and an HV-3 mode (drive mode 5) which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios ρ of the first and second planetary gear sets 14 and 16 are taken, and a vertical axis along which the relative rotating speeds are taken. The collinear charts indicate the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios ρ1 and ρ2 of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "ρ1". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "ρ2". In the drive system 10, the gear ratio ρ2 of the second planetary gear set 16 is higher than the gear ratio ρ1 of the first planetary gear set 14 (ρ2>ρ1). The drive modes of the drive system 10 will be described by reference to FIGS. 4-7.

The "EV-1 mode" indicated in FIG. 3 corresponds to a first motor drive mode of the drive system 10, which is preferably the EV drive mode in which the engine 12 is held at rest while the second electric motor MG2 is used as the vehicle drive power source. FIG. 4 is the collinear chart corresponding to the EV-1 mode. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this EV-1 mode, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this EV-1 mode, the carriers C1 and C2 are permitted to be rotated relative to each other, so that the hybrid vehicle can be driven in forward and backward directions in the EV drive mode using the second electric motor MG2 similar to an EV (electric) drive mode which is established in a vehicle provided with a so-called "THS" (Toyota Hybrid System) and in which the carrier C2 is fixed to the stationary member.

Figure 5:
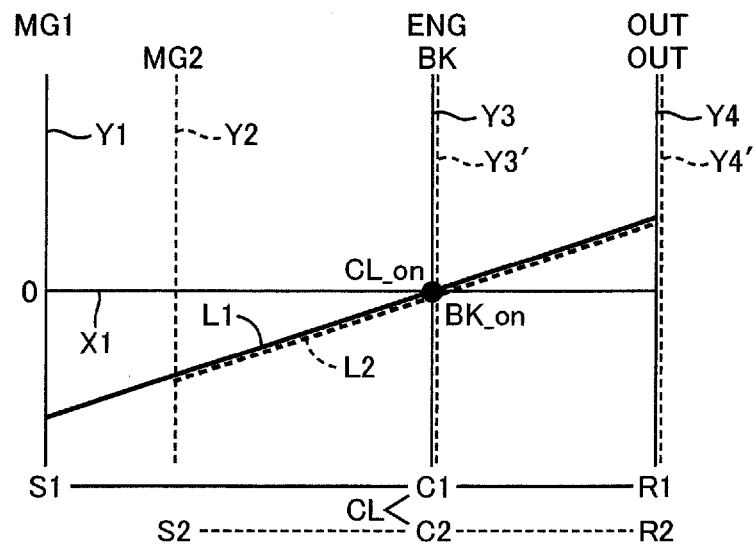
FIG. 5 is a collinear chart having straight lines which permit indication thereon of relative rotating speeds of various rotary elements of the drive system of FIG. 1, the collinear chart corresponding to the EV-2 mode of FIG. 3.

The "EV-2 mode" indicated in FIG. 3 corresponds to a second motor drive mode of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the EV-2 mode. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In the EV-2 mode, the rotating direction of the sun gear S1 and the rotating direction of the ring gear R1 in the first planetary gear set 14 are opposite to each other, and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 can be driven in the forward or reverse direction by at least one of the first electric motor MG1 and second electric motor MG2.

In the EV-2 mode, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the EV-2 mode is an EV drive mode which may be established under various running conditions of the hybrid vehicle, or may be kept for a relatively long length of time. Accordingly, the EV-2 mode is advantageously provided on a hybrid vehicle such as a plug-in hybrid vehicle, which is frequently placed in an EV drive mode.

The "HV-1 mode" indicated in FIG. 3 corresponds to a first engine (hybrid) drive mode of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the HV-1 mode. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this HV-1 mode, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
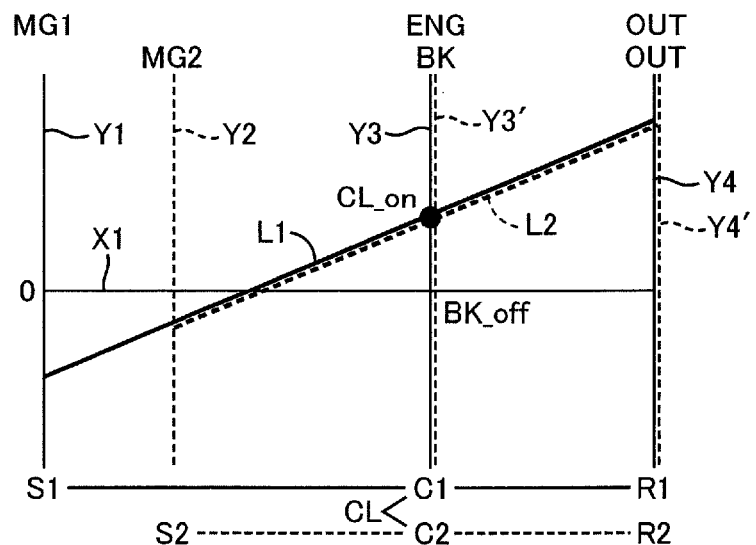
FIG. 6 is a collinear chart having straight lines which permit indication thereon of relative rotating speeds of various rotary elements of the drive system of FIG. 1, the collinear chart corresponding to the HV-2 mode of FIG. 3.

The "HV-2 mode" indicated in FIG. 3 corresponds to a second engine (hybrid) drive mode of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 6 is the collinear chart corresponding to the HV-2 mode. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the HV-2 mode of the drive system 10, the first planetary gear set 14 and second planetary gear set 16 function as a differential mechanism having a total of four rotary elements. That is, the HV-2 mode is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the HV-2 mode, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios $\rho1$ and $\rho2$ of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios $\rho1$ and $\rho2$. Accordingly, the drive system 10 is configured such that the gear ratio $\rho2$ of the second planetary gear set 16 is higher than the gear ratio $\rho1$ of the first planetary gear set 14.

In the HV-2 mode, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can receive a reaction force corresponding to the output of the engine 12. Namely, one or both of the first and second electric motors MG1 and MG2 can be operated to receive the reaction force during an operation of the engine 12, in other words, the amounts of work to be assigned to the first and second electric motors MG1 and MG2 can be adjusted with respect to each other. That is, in the mode 4, each of the first and second electric motors MG1 and MG2 can be operated at an operating point assuring a relatively high degree of operating efficiency, and/or with a reduced degree of torque limitation due to heat generation.

Figure 7:
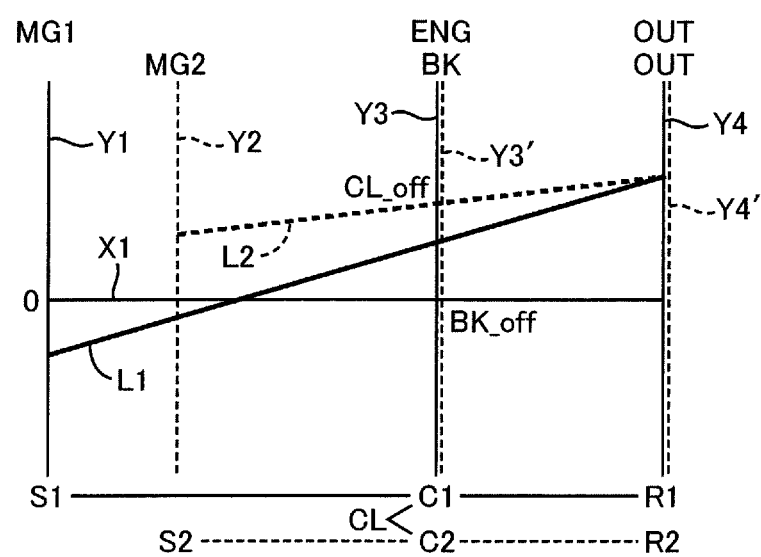
FIG. 7 is a collinear chart having straight lines which permit indication thereon of relative rotating speeds of various rotary elements of the drive system of FIG. 1, the collinear chart corresponding to the HV-3 mode of FIG. 3.

The "HV-3 mode" indicated in FIG. 3 corresponds to a third engine (hybrid) drive mode of the drive system 10, which is preferably the hybrid drive mode in which the engine 12 is operated as the vehicle drive power source while the first electric motor MG1 is operated to generate an electric energy, with a continuous change of the speed ratio, and with an operating point of the engine 12 being moved along a predetermined optimum operating curve. In this HV-3 mode, the engine 12 and first electric motor MG1 may be operated to generate a vehicle drive force, with the second electric motor MG2 being disconnected from a drive system. FIG. 7 is the collinear chart corresponding to this HV-3 mode. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive system (power transmitting path).

In the HV-1 mode in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the HV-3 mode, on the other hand, the engine 12 and the first electric motor MG1 may be operated to generate the vehicle drive force during running of the vehicle at the comparatively high speed, while the second electric motor MG2 is disconnected from the drive system, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source while the first and second electric motors MG1 and MG2 are operated as needed to generate a vehicle drive force and/or an electric energy, namely, in one of the HV-1 mode, the HV-2 mode and the HV-3 mode, which are selectively established by respective combinations of the engaged and released states of the clutch CL and brake BK. Accordingly, a transmission efficiency can be improved to improve the fuel economy of the vehicle, by selectively establishing one of the three hybrid drive modes according to the vehicle running speed and the speed ratio, in which the transmission efficiency is the highest.

Figure 8:
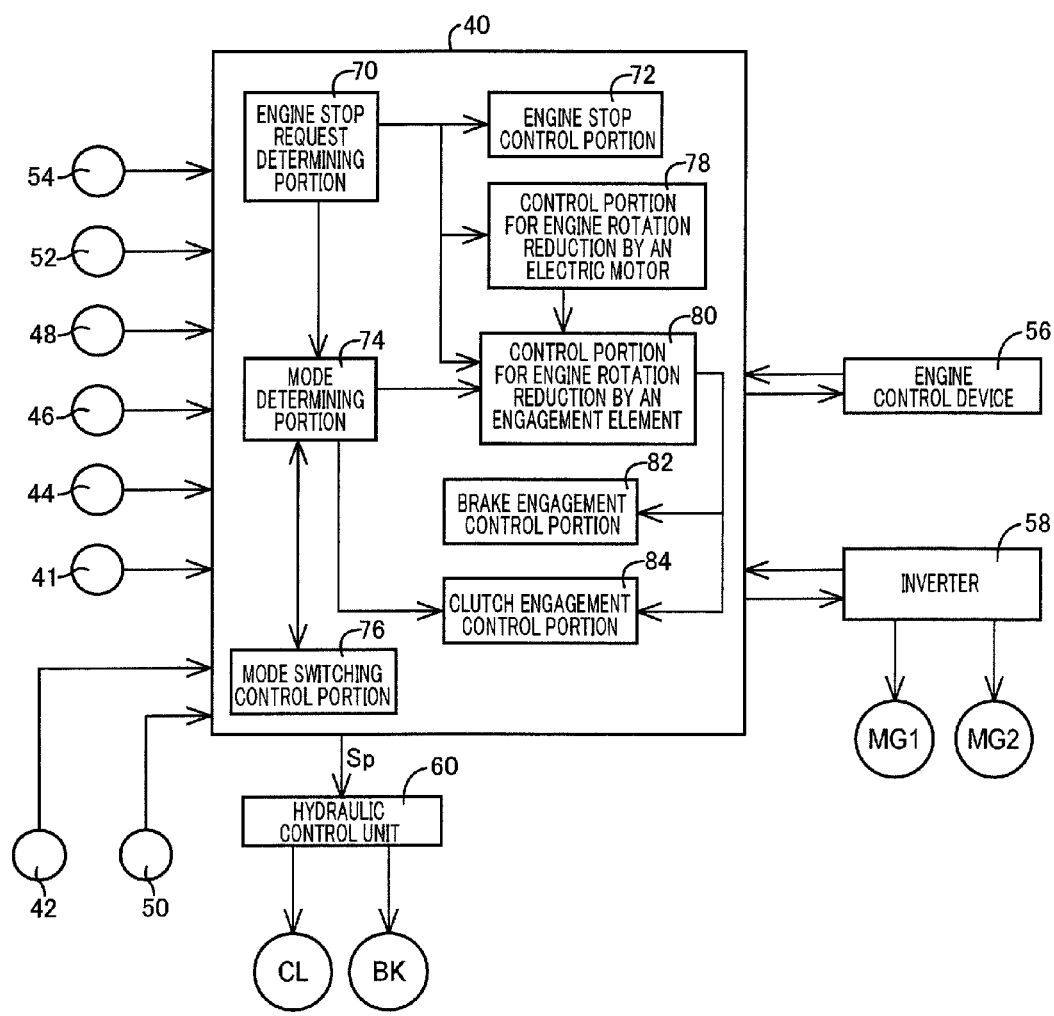
FIG. 8 is a functional block diagram for explaining major control functions of an electronic control device of FIG. 2.

FIG. 8 is the functional block diagram for explaining major control functions of the electronic control device 40 depicted in FIG. 2. An engine stop request determining means, i.e., an engine stop request determining portion 70 determines whether a stop request for the engine 12 is made from a drive state of the engine 12 (while the engine 12 is driven by the engine control device 56), i.e., whether a request for switching from the engine drive mode to the motor drive mode is made. For example, if a required vehicle drive force obtained from the accelerator pedal operation amount Acc and the vehicle running speed V falls below a preset determination value and enters a motor drive region, if SOC of a battery in the form of an electric storage device exceeds an upper limit value and enters a charge limit state, or if a motor drive selecting device is operated and switched to a motor drive position, the engine stop request determining portion 70 determines that a stop request for the engine 12 is made.

If the engine stop request determining portion 70 determines that the engine stop request is made, an engine stop control means, i.e., an engine stop control portion 72 stops the fuel supply to an intake pipe by a fuel injection device, the ignition by an ignition device, etc., which are performed through the engine control device 56, so as to stop actuation (operation) of the engine 12.

A mode determining means i.e., a mode determining portion 74 is configured to determine a presently established one of the five modes consisting of the EV-1 mode, the EV-2 mode, the HV-1 mode, the HV-2 mode and the HV-3 mode, on the basis of vehicle parameters such as the required vehicle drive force, the vehicle running speed V, the accelerator pedal operation amount Acc, the stored electric energy amount SOC and operating temperatures, or on the basis of output states of the engine control device 56 and the inverter 58, an output state of a mode switching control portion 76 described later, or an already set state of an appropriate memory flag.

A mode switching control means i.e. the mode switching control portion 76 is configured to implement a mode switching control for placing the drive system 10 in one of the drive modes which is selected by the mode determining portion 74. For instance, the mode switching control portion 76 determines whether the drive system 10 should be placed in an electric drive mode or a hybrid drive mode, depending upon whether the operator's required vehicle drive force represented by the vehicle running speed V and the accelerator pedal operation amount Acc lies in a predetermined electric drive region or an engine drive region, or on the basis of a requirement based on the stored electric energy amount SOC. If the electric drive mode is selected, the mode switching control portion 76 establishes one of the EV-1 mode and the EV-2 mode, on the basis of the requirement based on the stored electric energy amount SOC and the operator's selection. If the hybrid drive mode is selected, the mode switching control portion 76 establishes one of the drive modes the HV-1 mode, the HV-2 mode and the HV-3 mode, on the basis of an operating efficiency of the engine 12, the transmission efficiency, the required vehicle drive force, etc., so as to provide a good compromise between the vehicle drivability and the fuel economy. For example, the mode switching control portion 76 establishes the HV-1 mode at a relatively low running speed in a relatively low-gear (high speed-reduction ratio) range, the HV-2 mode at a relatively intermediate running speed in a relatively intermediate-gear (intermediate speed-reduction ratio) range, the HV-3 mode at a relatively high running speed in a relatively high-gear (low speed-reduction ratio) range. For example, when the drive mode is switched from the EV-2 mode that is a motor drive mode in which the first and second electric motors MG1 and MG2 are used as vehicle drive power sources to the HV-1 mode that is an engine drive mode, this mode switching control portion 76 releases the clutch CL through the hydraulic control unit 60 out of the clutch CL and the brake BK that have been placed in the engaged state, starts the engine 12 by the first electric motor MG1, and continues the engagement of the brake BK. Namely, the mode switching control portion 76 switches the operating state from the state shown in the collinear chart of FIG. 5 to the state shown in the collinear chart of FIG. 4.

If the engine stop request determining portion 70 determines that the engine stop request is made, a control means for engine rotation reduction by an electric motor, i.e., a control portion 78 for engine rotation reduction by an electric motor provides a feedback control such that the engine speed NE is made identical to a predefined target engine speed NE1 by the first electric motor MG1, or the first electric motor MG1 and the second electric motor MG2, to quickly reduce the engine speed NE toward zero rotation. The target engine speed NE1 is a value set in advance through experiments such that the engine speed NE does not become smaller than 0 rpm even if the engine speed NE overshoots the target engine speed NE1 at the time of the feedback control by the electric motor, i.e., such that the engine 12 does not reversely rotate, and the target engine speed NE1 is 50 rpm, for example. The control portion 78 for engine rotation reduction by an electric motor terminates the feedback control by the electric motor when the engine speed NE reaches the target engine speed NE1, i.e., when the engine speed NE becomes lower than the target engine speed NE1.

Figure 9A:
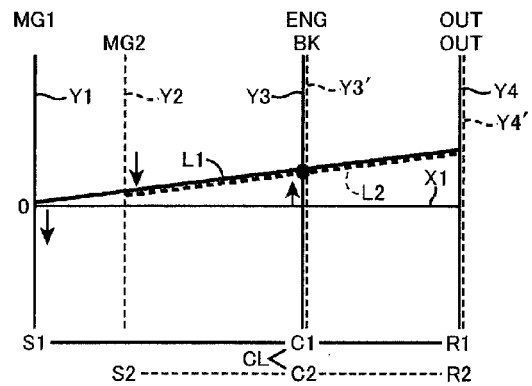
FIGS. 9A-9C are collinear charts for explaining control operations performed by a control portion for engine rotation reduction by an electric motor and a control portion for engine rotation reduction by an engagement element of FIG. 8, the collinear charts indicating a state until an engine speed is stopped for making a shift from the HV-2 mode to the EV-2 mode.
Figure 9B:
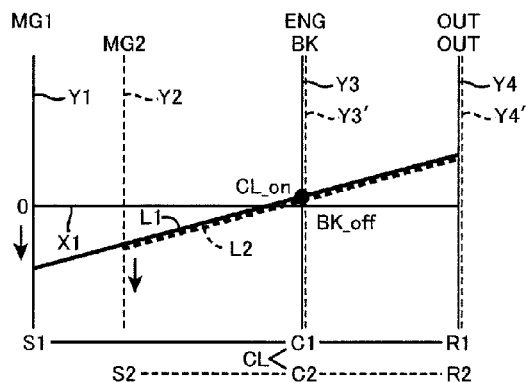
Figure 9C:
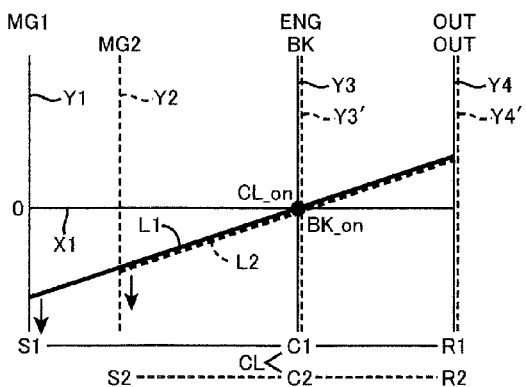

For example, if the engine stop request determining portion 70 makes the engine stop request during running in the HV-2 mode in which the brake BK is placed in the released state while the clutch CL is placed in the engaged state as depicted in (a) of FIG. 9, the control portion 78 for engine rotation reduction by an electric motor causes the sun gears S1 and S2 to be rotated in the negative direction by the negative torques of the first electric motor MG1 and the second electric motor MG2 so that the engine speed NE is reduced toward the target engine speed NE1 as depicted in (b) of FIG. 9. If the engine stop request determining portion 70 makes the engine stop request during running in the HV-1 mode in which the brake BK is placed in the engaged state while the clutch CL is placed in the released state as depicted in (a) of FIG. 10, the control portion 78 for engine rotation reduction by an electric motor causes the sun gear S1 to be rotated in the negative direction by the negative torque of the first electric motor MG1 so that the engine speed NE is reduced toward the target engine speed NE1 as depicted in (b) of FIG. 10. The control portion 78 for engine rotation reduction by an electric motor has sensitivity or followability of the feedback control enhanced for allowing the engine to quickly pass through a resonance band in which the engine speed NE causes resonance of a drive system in the process of stopping the operation of the engine 12 and reducing the engine speed NE to the target engine speed NE1 through the feedback control by the electric motor.

If the engine stop request determining portion 70 determines that the engine stop request is made and the control portion 78 for engine rotation reduction by an electric motor determines that the feedback control by the electric motor is terminated, a control means for engine rotation reduction by an engagement element, i.e., a control portion 80 for engine rotation reduction by an engagement element outputs a command signal for engaging the clutch CL or the brake BK acting as an engagement element to a brake engagement control portion 82 or a clutch engagement control portion 84. The control portion 80 for engine rotation reduction by an engagement element determines either the clutch CL or the brake BK as the engagement element to be engaged depending on a drive mode (the HV-1 or HV-2 mode) determined by the mode determining portion 74 when the engine stop request is made from the engine stop request determining portion 70. In particular, if the drive mode is determined as the HV-1 mode, the command signal for engaging the clutch CL is output and, if the drive mode is determined as the HV-2 mode, the command signal for engaging the brake BK is output.

A brake engagement control means, i.e., the brake engagement control portion 82 outputs the hydraulic control command signal Sp placing the brake BK in the engaged or released state from the electronic control device 40 to the hydraulic control unit 60 according to the command signal output from the control portion 80 for engine rotation reduction by an engagement element. The hydraulic control unit 60 controls the hydraulic pressure output from the electromagnetic valves such as linear solenoid valves in the hydraulic control unit 60 according to the hydraulic control command signal Sp and the brake BK is placed in the engaged or released state.

For example, the control portion 80 for engine rotation reduction by an engagement element and the brake engagement control portion 82 place the brake BK in the engaged state when the engine speed NE reaches the target engine speed NE1 as depicted in (b) of FIG. 9 and the feedback control by the electric motor is terminated in the control portion 78 for engine rotation reduction by an electric motor during running in the HV-2 mode. Therefore, since the carrier C1 connected to the engine 12 is relatively non-rotatably connected via the carrier C2 to the stationary member in the form of the housing 26 as depicted in (c) of FIG. 9, the engine speed NE is reduced until the rotation stops and the reverse rotation of the engine 12 is prevented.

A clutch engagement control means, i.e., the clutch engagement control portion 84 outputs the hydraulic control command signal Sp placing the clutch CL in the engaged or released state from the electronic control device 40 to the hydraulic control unit 60 according to the command signal output from the control portion 80 for engine rotation reduction by an engagement element. The hydraulic control unit 60 controls the hydraulic pressure output from the electromagnetic valves such as linear solenoid valves in the hydraulic control unit 60 according to the hydraulic control command signal Sp and the clutch CL is placed in the engaged or released state.

Figure 10A:
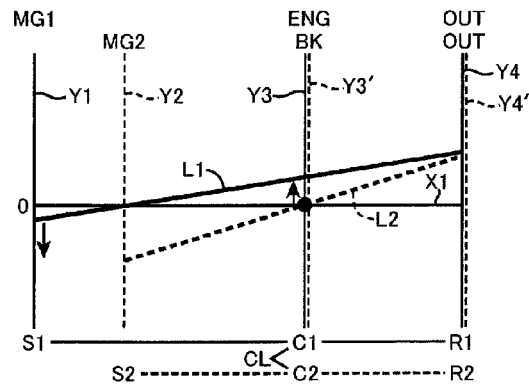
FIGS. 10A-10C are collinear charts for explaining control operations performed by a control portion for engine rotation reduction by an electric motor and a control portion for engine rotation reduction by an engagement element of FIG. 8, the collinear charts indicating a state until an engine speed is stopped for making a shift from the HV-1 mode to the EV-2 mode.
Figure 10B:
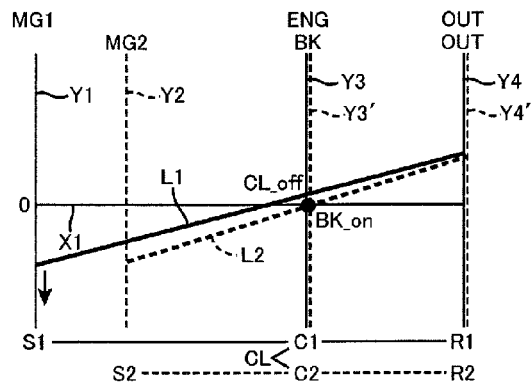
Figure 10C:
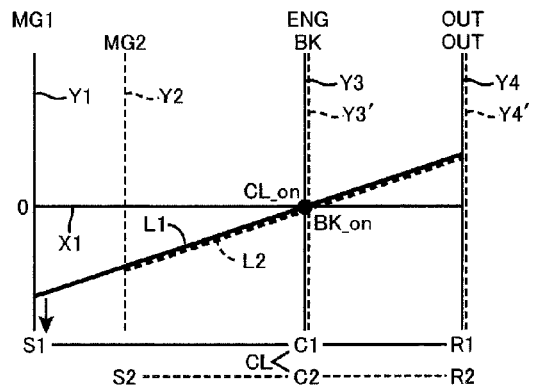

For example, the control portion 80 for engine rotation reduction by an engagement element and the clutch engagement control portion 84 place the clutch CL in the engaged state when the engine speed NE reaches the target engine speed NE1 as depicted in (b) of FIG. 10 and the feedback control by the electric motor is terminated in the control portion 78 for engine rotation reduction by an electric motor during running in the HV-1 mode. Therefore, since the carrier C1 relatively non-rotatably connected to the engine 12 is relatively non-rotatably connected to the carrier C2 relatively non-rotatably connected to the stationary member in the form of the housing 26 as depicted in (c) of FIG. 10, the engine speed NE is reduced until the rotation stops and the reverse rotation of the engine 12 is prevented.

If the mode switching control portion 76 makes an request for the EV-1 or EV-2 mode according to the operator's required vehicle drive force etc. determined based on the vehicle running speed V and the accelerator pedal operation amount Acc, the clutch engagement control portion 84 outputs the hydraulic control command signal Sp placing the clutch CL in the engaged or released state from the electronic control device 40 to the hydraulic control unit 60 according to the request, after the command signal is output from the control portion 80 for engine rotation reduction by an engagement element. In particular, after the command signal is output from the control portion 80 for engine rotation reduction by an engagement element, the drive mode is set to the EV-2 mode in which the brake BK and the clutch CL are placed in the engaged state and, therefore, if the EV-2 mode is requested, the engaged state of the clutch CL is continued. If the EV-2 mode is not requested, i.e., if the EV-1 mode is requested, the clutch CL is placed in the released state.

Figure 11:
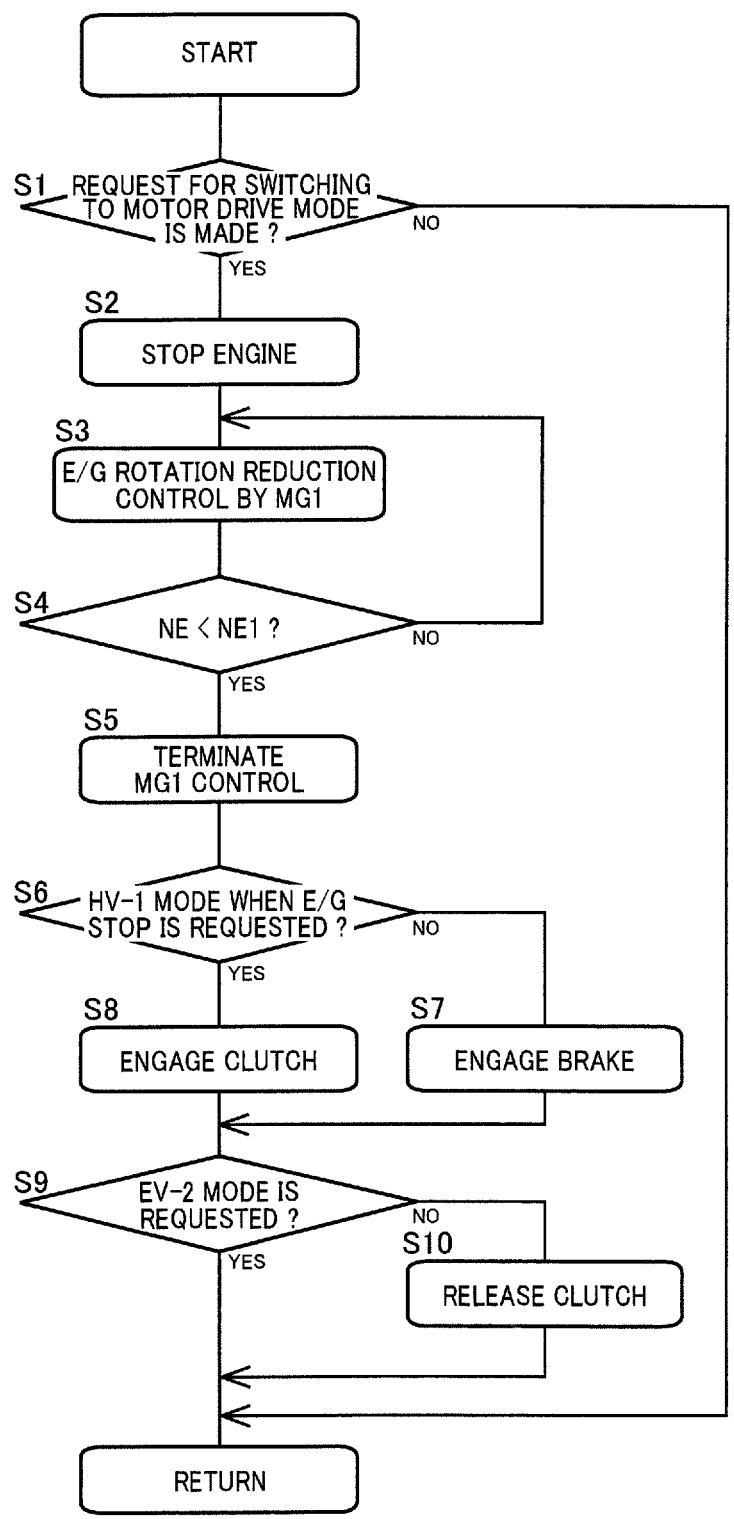
FIG. 11 is a flowchart for explaining major portions of a control operation of preventing the reverse rotation of the engine when the engine speed is stopped for making a shift from an engine drive mode to a motor drive mode, by the electronic control device of FIG. 2.
Figure 12:
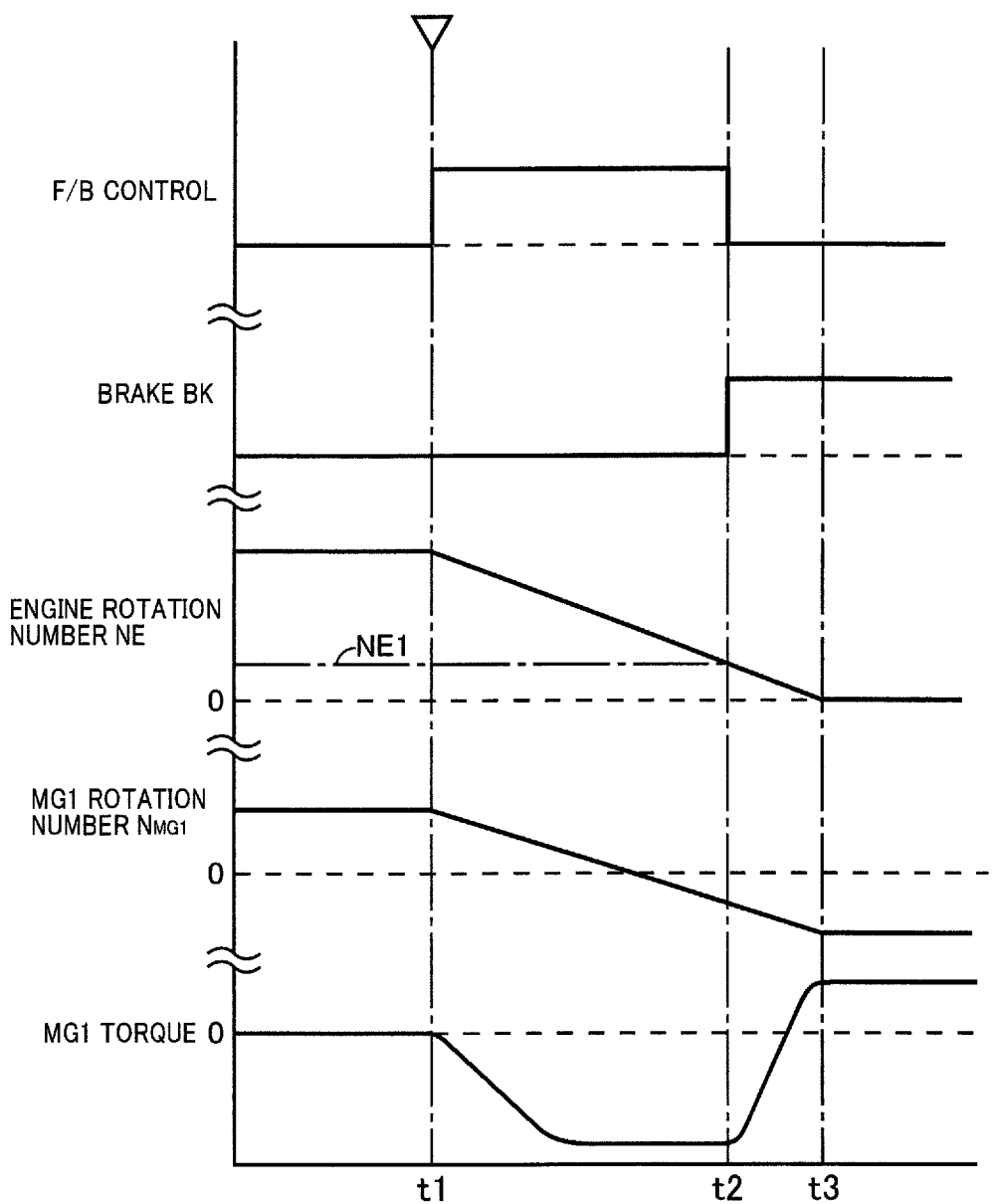
FIG. 12 is a time chart corresponding to the control operation of FIG. 11.
Figure 13:
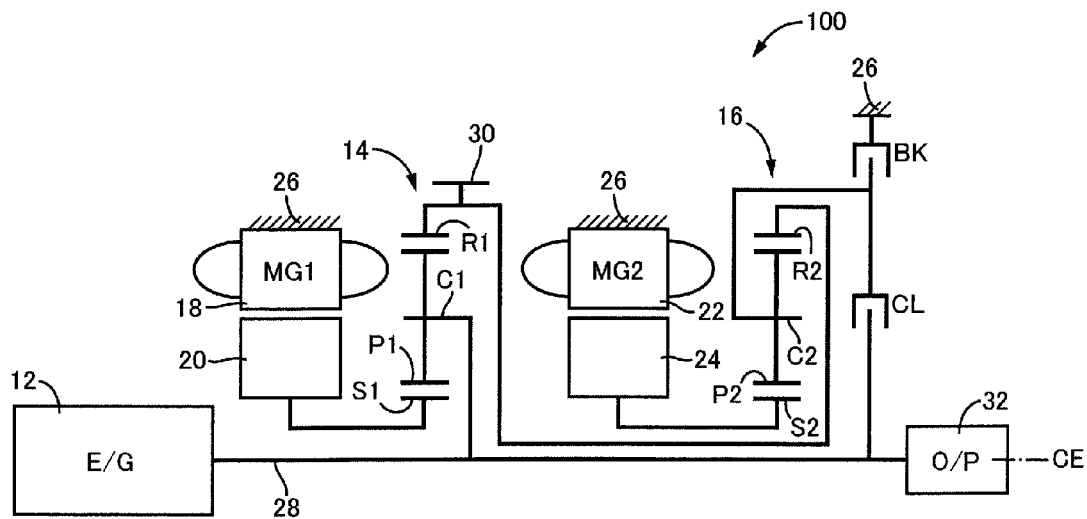
FIG. 13 is a schematic view for explaining an arrangement of a hybrid vehicle drive system according to another preferred embodiment of this invention.
Figure 14:
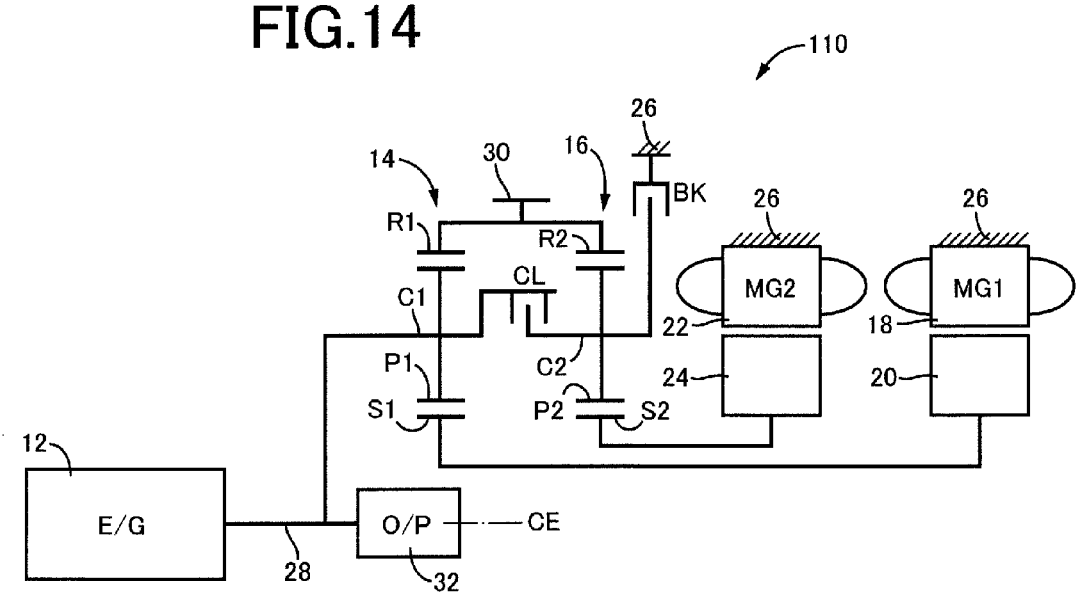
FIG. 14 is a schematic view for explaining an arrangement of a hybrid vehicle drive system according to a further preferred embodiment of this invention.
Figure 15:
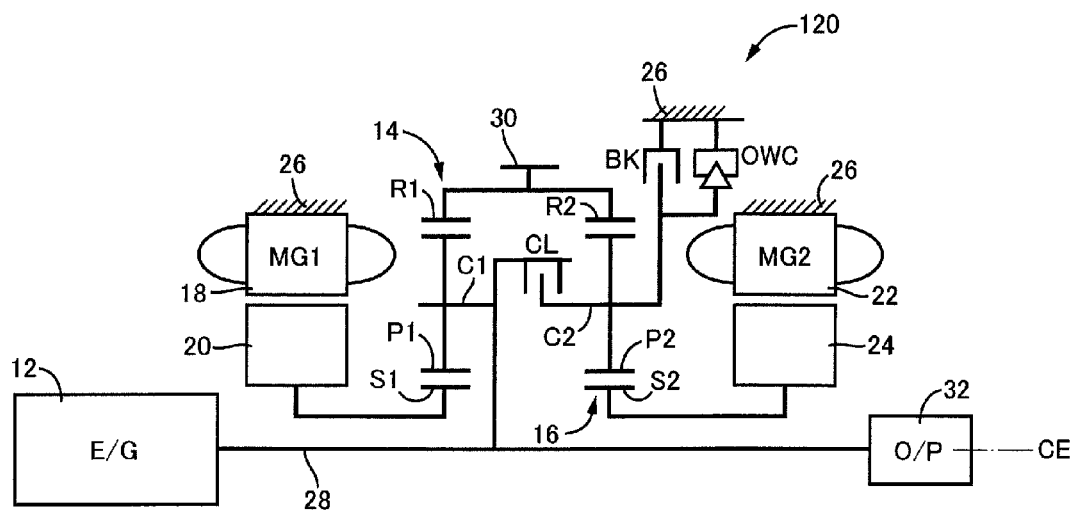
FIG. 15 is a schematic view for explaining an arrangement of a hybrid vehicle drive system according to a still further preferred embodiment of this invention.
Figure 16:
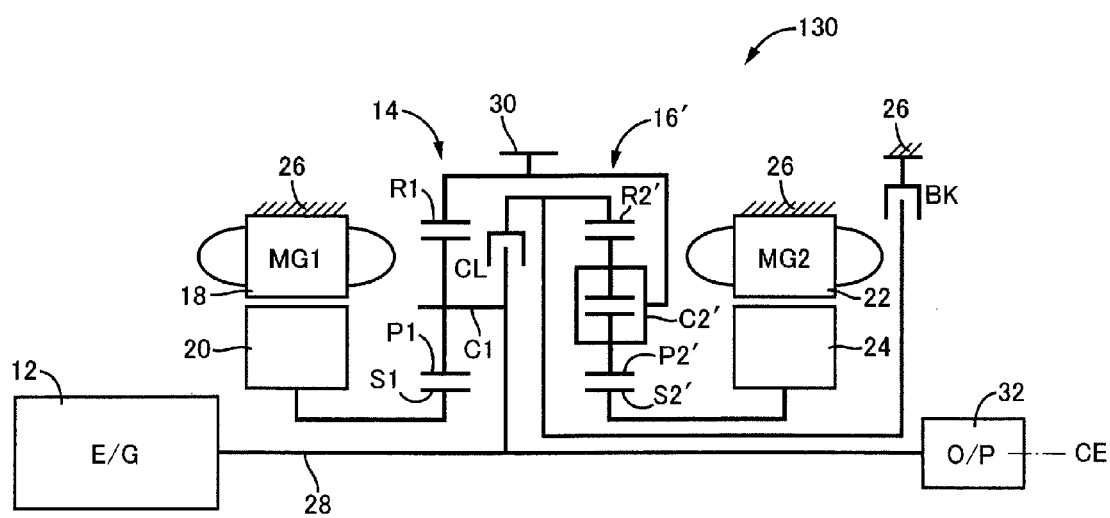
FIG. 16 is a schematic view for explaining an arrangement of a hybrid vehicle drive system according to a yet further preferred embodiment of this invention.

FIG. 11 is a flowchart for explaining major portions of a control operation of preventing the reverse rotation of the engine 12 when the engine speed NE is stopped for making a shift from an engine drive mode (HV-1 mode, HV-2 mode) to a motor drive mode (EV-1 mode, EV-2 mode) in the electronic control device 40 of FIG. 2. The control operation is repeatedly performed with a predetermined cycle time. FIG. 12 is a time chart corresponding to the control operation of FIG. 11 and depicts a shift from the HV-2 mode to the EV-2 mode.

In FIG. 11, first, at step S1 ("step" being hereinafter omitted) corresponding to the engine stop request determining portion 70, it is determined whether an engine stop request is made, i.e., whether a request for switching to the motor drive mode is made. If a negative determination is obtained at S1, the present routine is terminated. If an affirmative determination is obtained, the flow goes to S2 corresponding to the engine stop control portion 72, in which the operation of the engine 12 is stopped.

S3, S4, and S5 corresponding to the control portion 78 for engine rotation reduction by an electric motor are executed from t1 to t2 of FIG. 12. In particular, in S3 (time point t1 of FIG. 12) after the operation of the engine 12 is stopped, the feedback control by the first electric motor MG1 is provided such that the engine speed NE is actively reduced toward the target engine speed NE1 set in advance to a value (50 rmp) larger than zero. In S4, it is determined whether the engine speed NE reaches the target engine speed NE1. If a negative determination is obtained at S4, the feedback control by the first electric motor MG1 in S3 is continued. If an affirmative determination is obtained (time point t2 of FIG. 12), the feedback control by the first electric motor MG1 is terminated in S5.

In S6 corresponding to the mode determining portion 74, the engine stop request determining portion 70 determines whether the engine drive mode at the time of the engine stop request is the HV-1 or HV-2 mode, i.e., whether the engine drive mode is the HV-1 mode. If a negative determination is obtained in S6, i.e., if the engine drive mode is the HV-2 mode, the flow goes to S7 corresponding to the control portion 80 for engine rotation reduction by an engagement element and the brake engagement control portion 82, in which the brake BK is placed in the engaged state and the engine speed NE is reduced to stop the rotation (time point t3 of FIG. 12). If an affirmative determination is obtained in S6, i.e., if the engine drive mode is the HV-1 mode, the flow goes to S8 corresponding to the control portion 80 for engine rotation reduction by an engagement element and the clutch engagement control portion 84, in which the clutch CL is placed in the engaged state and the engine speed NE is reduced to stop the rotation (time point t3 of FIG. 12).

The flow goes to S9 corresponding to the mode switching control portion 76, to determining whether the EV-2 mode is requested. If a negative determination is obtained in S9, the flow goes to S10 corresponding to the clutch engagement control portion 84, in which the clutch CL is released from the engaged state. If an affirmative determination is obtained in S9, the engaged state of the clutch CL is continued.

In the electronic control device 40 of the drive system 10 of this embodiment, if an engine stop request is made when the engine speed NE is stopped for making a shift from an engine drive mode (HV-1 mode, HV-2 mode) to a motor drive mode (EV-1 mode, EV-2 mode), the engine speed NE is reduced to the target engine speed NE1 (from t1 to t2 of FIG. 12) set to a value larger than zero through the feedback control by the electric motor provided by the control portion 78 for engine rotation reduction by an electric motor and, subsequently, the clutch CL or the brake BK is placed in the engaged state by the control portion 80 for engine rotation reduction by an engagement element to reduce the rotation of the engine 12 from the target engine speed NE1 until the rotation stops (from t2 to t3 of FIG. 12).

As described above, according to the electronic control device 40 of the drive system 10 of this embodiment, when the operating speed NE of the engine 12 is stopped for making a shift from an engine drive mode (HV-1 mode, HV-2 mode) in which the engine 12 is driven for running to a motor drive mode (EV-1 mode, EV-2 mode), the control portion 80 for engine rotation reduction by an engagement element uses the clutch CL or the brake BK to stop the operating speed NE of the engine 12. Therefore, when the engine speed NE reaches the target engine speed NE1 through the feedback control by the electric motor provided by the control portion 78 for engine rotation reduction by an electric motor, the control portion 80 for engine rotation reduction by an engagement element places the brake BK or the clutch CL in the engaged state to stop the engine speed NE and, thus, the engine speed NE is reduced without reverse rotation of the engine 12.

According to the electronic control device 40 of the drive system 10 of this embodiment, the control portion 78 for engine rotation reduction by an electric motor uses the first electric motor MG1 to reduce the operating speed NE of the engine 12 and the control portion 80 for engine rotation reduction by an engagement element then places the clutch CL or the brake BK in the engaged state to reduce the operating speed NE of the engine 12 to zero. Therefore, as compared to when the engine 12 is stopped by only the clutch CL or the brake BK without the feedback control by the electric motor provided by the control portion 78 for engine rotation reduction by an electric motor, the abrasion of the clutch CL or the brake BK is preferably suppressed and the durability of the clutch CL or the brake BK is improved.

According to the electronic control device 40 of the drive system 10 of this embodiment, the first electric motor MG1 provides the feedback control such that the operating speed NE of the engine 12 is reduced toward the target speed NE1 set in advance to a value larger than zero. Therefore, since the feedback control by the electric motor provided by the control portion 78 for engine rotation reduction by an electric motor is terminated before the engine 12 stops and a switch is made such that the control portion 80 for engine rotation reduction by an engagement element places the clutch CL or brake BK in the engaged state to reduce the engine speed NE, the sensitivity or followability of the feedback control is enhanced so as to allow the engine 12 to relatively quickly pass through the resonance band of the engine speed NE and the reverse rotation of the engine 12 is preferably prevented even when the engine speed NE overshoots the target engine speed NE1.

According to the electronic control device 40 of the drive system 10 of this embodiment, the drive mode is shifted from the HV-1 mode in which the brake BK is placed in the engaged state while the clutch CL is placed in the released state, to the EV-2 mode in which the brake BK and the clutch CL are placed in the engaged state. Therefore, by placing the clutch CL in the engaged state, the carrier C1 connected to the engine 12 is relatively non-rotatably connected via the carrier C2 to the housing 26 and the operating speed NE of the engine 12 is reduced to stop the rotation, and the motor running in the EV-2 mode can be performed in this engaged state without change.

Other preferred embodiments of the present invention will be described in detail by reference to the drawings. In the following description, the same reference signs will be used to identify the same elements in the different embodiments, which will not be described redundantly.

Second Embodiment

FIGS. 13-18 are the schematic views for explaining arrangements of respective hybrid vehicle drive systems 100, 110, 120, 130, 140 and 150 according to other preferred modes of this invention used instead of the hybrid vehicle drive system 10 in the first embodiment. The hybrid vehicle drive control device of the present invention is also applicable to drive systems such as the drive system 100 shown in FIG. 13 and the drive system 110 shown in FIG. 14, which have respective different arrangements of the first electric motor MG1, first planetary gear set 14, second electric motor MG2, second planetary gear set 16, clutch CL and brake BK in the direction of the center axis CE. The present hybrid vehicle drive control device is also applicable to drive systems such as the drive system 120 shown in FIG. 15, which have a one-way clutch OWC disposed between the carrier C2 of the second planetary gear set 16 and the stationary member in the form of the housing 26, in parallel with the brake BK, such that the one-way clutch OWC permits a rotary motion of the carrier C2 relative to the housing 26 in one of opposite directions and inhibits a rotary motion of the carrier C2 in the other direction. The present hybrid vehicle drive control device is further applicable to drive systems such as the drive system 130 shown in FIG. 16, the drive system 140 shown in FIG. 17 and the drive system 150 shown in FIG. 18, which are provided with a second differential mechanism in the form of a second planetary gear set 16' of a double-pinion type, in place of the second planetary gear set 16 of a single-pinion type. This second planetary gear set 16' is provided with rotary elements (elements) consisting of: a first rotary element in the form of a sun gear S2'; a second rotary element in the form of a carrier C2' supporting a plurality of pinion gears P2' meshing with each other such that each pinion gear P2' is rotatable about its axis and the axis of the planetary gear set; and a third rotary element in the form of a ring gear R2' meshing with the sun gear S2' through the pinion gears P2'.

Each of the hybrid vehicle drive systems 100, 110, 120, 130, 140 and 150 according to the present second embodiment is provided with: a first differential mechanism in the form of the first planetary gear set 14 having a first rotary element in the form of the sun gear S1 connected to the first electric motor MG1, a second rotary element in the form of the carrier C1 connected to the engine 12, and a third rotary element in the form of the ring gear R1 connected to an output rotary member in the form of the output gear 30; a second differential mechanism in the form of the second planetary gear set 16 (16') which has a first rotary element in the form of the sun gear S2 (S2') connected to the second electric motor MG2, a second rotary element in the form of the carrier C2 (C2') and a third rotary element in the form of the ring gear R2 (R2'), and in which one of the carrier C2 (C2') and the ring gear R2 (R2') is connected to the ring gear R1 of the first planetary gear set 14; the clutch CL for selectively connecting the carrier C1 of the first planetary gear set 14 and the other of the carrier C2 (C2') and the ring gear R2 (R2') which is not connected to the ring gear R1, to each other; and the brake BK for selectively fixing the other of the carrier C2 (C2') and the ring gear R2 (R2') which is not connected to the ring gear R1, to a stationary member in the form of the housing 26. Accordingly, by disposing the electronic control device 40 of the first embodiment, when the operating speed NE of the engine 12 is stopped for making a shift from an engine drive mode (HV-1 mode, HV-2 mode) in which the engine 12 is driven for running to a motor drive mode (EV-1 mode, EV-2 mode), the control portion 80 for engine rotation reduction by an engagement element uses the clutch CL or the brake BK to stop the operating speed NE of the engine 12 and, therefore, when the engine speed NE reaches the target engine speed NE1 through the feedback control by the electric motor provided by the control portion 78 for engine rotation reduction by an electric motor, the control portion 80 for engine rotation reduction by an engagement element places the brake BK or the clutch CL in the engaged state to stop the engine speed NE and, thus, the engine speed NE is reduced without reverse rotation of the engine 12, resulting in the same effect as the first embodiment.

Third Embodiment

Figure 17:
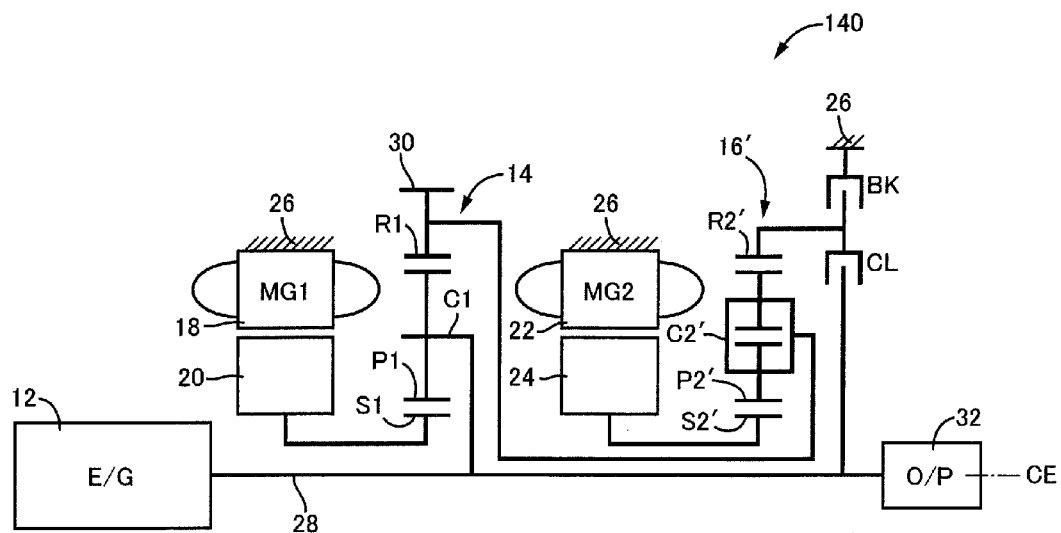
FIG. 17 is a schematic view for explaining an arrangement of a hybrid vehicle drive system according to still another preferred embodiment of this invention.
Figure 18:
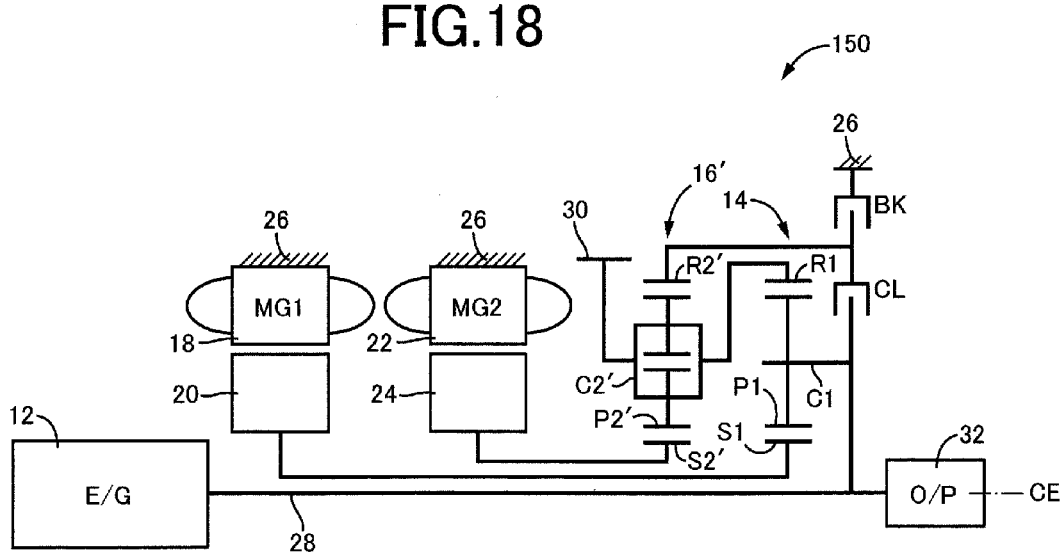
FIG. 18 is a schematic view for explaining an arrangement of a hybrid vehicle drive system according to yet another preferred embodiment of this invention.
Figure 19:
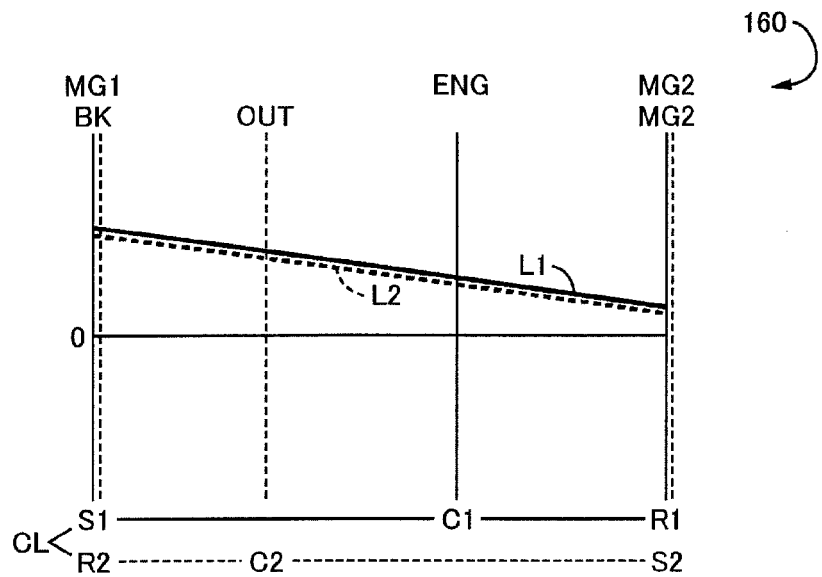
FIG. 19 is a collinear chart for explaining an arrangement and an operation of a hybrid vehicle drive system according to another preferred embodiment of this invention.
Figure 20:
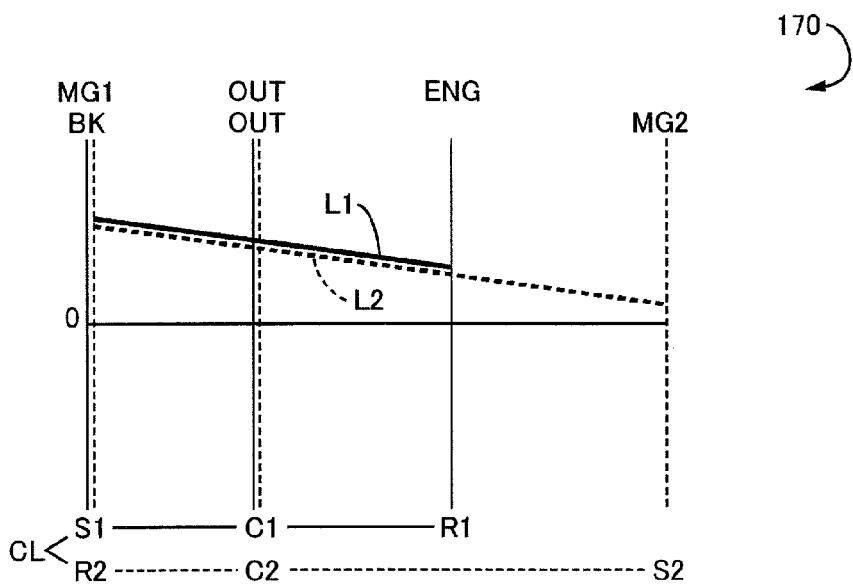
FIG. 20 is a collinear chart for explaining an arrangement and an operation of a hybrid vehicle drive system according to a further preferred embodiment of this invention.
Figure 21:
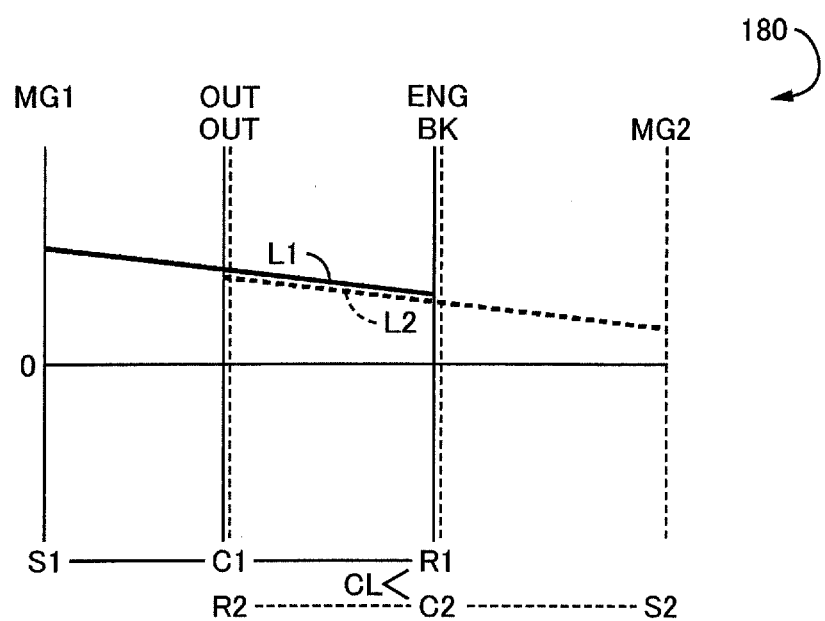
FIG. 21 is a collinear chart for explaining an arrangement and an operation of a hybrid vehicle drive system according to a still further preferred embodiment of this invention.

FIGS. 19-21 are the collinear charts for explaining arrangements and operations of respective hybrid vehicle drive systems 160, 170 and 180 according to other preferred modes of this invention in place of the drive system 10 of the embodiment 1. In FIGS. 17-19, the relative rotating speeds of the sun gear S1, carrier C1 and ring gear R1 of the first planetary gear set 14 are represented by the solid line L1, while the relative rotating speeds of the sun gear S2, carrier C2 and ring gear R2 of the second planetary gear set 16 are represented by the broken line L2, as described above. In the hybrid vehicle drive system 160, the sun gear S1, carrier C1 and ring gear R1 of the first planetary gear set 14 are respectively connected to the first electric motor MG1, engine 12 and second electric motor MG2, while the sun gear S2, carrier C2 and ring gear R2 of the second planetary gear set 16 are respectively connected to the second electric motor MG2 and output rotary member 30, and to the stationary member 26 through the brake BK. The sun gear S1 and the ring gear R2 are selectively connected to each other through the clutch CL. The ring gear R1 and the sun gear S2 are connected to each other. In the hybrid vehicle drive system 170, the sun gear S1, carrier C1 and ring gear R1 of the first planetary gear set 14 are respectively connected to the first electric motor MG1, output rotary member 30 and engine 12, while the sun gear S2, carrier C2 and ring gear R2 of the second planetary gear set 16 are respectively connected to the second electric motor MG2 and output rotary member 30, and to the stationary member 26 through the brake BK. The sun gear S1 and the ring gear R2 are selectively connected to each other through the clutch CL. The carriers C1 and C2 are connected to each other. In the hybrid vehicle drive system 180, the sun gear S1, carrier C1 and ring gear R1 of the first planetary gear set 14 are respectively connected to the first electric motor MG1, output rotary member 30 and engine 12, while the sun gear S2, carrier C2 and ring gear R2 of the second planetary gear set 16 are respectively connected to the second electric motor MG2, to the stationary member 26 through the brake BK, and to the output rotary member 30. The ring gear R1 and the carrier C2 are selectively connected to each other through the clutch CL. The carrier C1 and the ring gear R2 are connected to each other.

In the embodiment of FIGS. 19 to 21, by disposing the electronic control device 40 of the first embodiment, when the operating speed NE of the engine 12 is stopped for making a shift from an engine drive mode (HV-1 mode, HV-2 mode) in which the engine 12 is driven for running to a motor drive mode (EV-1 mode, EV-2 mode), the control portion 80 for engine rotation reduction by an engagement element uses the clutch CL or the brake BK to stop the operating speed NE of the engine 12 and, therefore, when the engine speed NE reaches the target engine speed NE1 through the feedback control by the electric motor provided by the control portion 78 for engine rotation reduction by an electric motor, the control portion 80 for engine rotation reduction by an engagement element places the brake BK or the clutch CL in the engaged state to stop the engine speed NE and, thus, the engine speed NE is reduced without reverse rotation of the engine 12, resulting in the same effect as the first embodiment.

The hybrid vehicle drive control systems in the embodiment depicted in FIGS. 19 to 21 are identical with the embodiments depicted in FIGS. 4 to 7 and 13 to 18 in that each of these hybrid vehicle drive systems includes the first planetary gear set 14 acting as the first differential mechanism and the second planetary gear set 16, 16' acting as the second differential mechanism, which have four rotary elements (which are represented as four rotary elements) on the collinear chart, as well as the first electric motor MG1, the second electric motor MG2, the engine 12, and the output rotary member (output gear 30) which are connected to the respective four rotary elements, that one of the four rotary elements is constituted by the rotary element of the first planetary gear set 14 and the rotary element of the second planetary gear set 16, 16' which are selectively connected to each other through the clutch CL, and that the rotary element of the second planetary gear set 16, 16' to be engaged through the clutch CL is selectively connected to the stationary member in the form of the housing 26 through the brake BK. Therefore, the hybrid vehicle drive control system of the present invention described with reference to FIG. 8 etc. is preferably applied to the configurations depicted in FIGS. 19 to 21.

In the embodiments depicted in FIGS. 19 to 21, as is the case with the embodiments depicted in FIGS. 4 to 7 and 13 to 18, the first planetary gear set 14 includes a first rotary element in the form of the sun gear S1 connected to the first electric motor MG1, a second rotary element in the form of the carrier C1 connected to the engine 12, and a third rotary element in the form of the ring gear R1 connected to the output gear 30; the second planetary gear set 16 (16') includes a first rotary element in the form of the sun gear S2 (S2') connected to the second electric motor MG2, a second rotary element in the form of the carrier C2 (C2'), and a third rotary element in the form of the ring gear R2 (R2'); one of the carrier C2 (CT) and the ring gear R2 (R2') is connected to the ring gear R1 of the first planetary gear set 14; the clutch CL selectively connects the carrier C1 of the first planetary gear set 14 and the other of the carrier C2 (CT) and the ring gear R2 (R2') which is not connected to the ring gear R1, to each other; and the brake BK selectively fixes the other of the carrier C2 (CT) and the ring gear R2 (R2') which is not connected to the ring gear R1, to a stationary member in the form of the housing 26.

Although the embodiments of the present invention have been described in detail with reference to the drawings, the present invention is applied in other forms.

Although the control portion 80 for engine rotation reduction by an engagement element uses the clutch CL or the brake BK to stop the operating speed NE of the engine 12 after the engine speed NE is reduced through the feedback control provided by the control portion 78 for engine rotation reduction by an electric motor when the operating speed NE of the engine 12 is stopped for making a shift from an engine drive mode to a motor drive mode in the electronic control device 40 of the embodiments, the engine 12 may be stopped by only the clutch CL or the brake BK without the feedback control provided by the control portion 78 for engine rotation reduction by an electric motor.

Although the control portion 80 for engine rotation reduction by an engagement element places the clutch CL or the brake BK in the engaged state after the feedback control provided by the control portion 78 for engine rotation reduction by an electric motor is terminated when the engine speed NE of the engine 12 is stopped for making a shift from an engine drive mode to a motor drive mode in the electronic control device 40 of the embodiments, the clutch CL or the brake BK may be placed in the engaged state before the feedback control is terminated. For example, the control may be provided such that an engagement capacity of the brake BK or the clutch CL gradually increases as the engine speed NE comes closer to the target engine speed NE1 through the feedback control, or that the sensitivity or followability of the feedback control is made lower as the engagement capacity of the brake BK or the clutch CL gradually increases.

The above description is merely exemplary embodiments and the present invention can be implemented in variously modified and improved forms based on the knowledge of those skilled in the art.

NOMENCLATURE OF ELEMENTS

10, 100, 110, 120, 130, 140, 150, 160, 170, 180: hybrid vehicle drive system 12: engine 14: first planetary gear set (first differential mechanism) 16, 16': second planetary gear set (second differential mechanism) 26: housing (stationary member) 30: output gear (output rotary member) 40: electronic control device (drive control device) 70: engine stop request determining portion 78: control portion for engine rotation reduction by an electric motor 80: control portion for engine rotation reduction by an engagement element MG1: first electric motor MG2: second electric motor BK: brake CL: clutch NE: engine speed (operating speed of the engine, rotation speed of the engine) NE1: target engine speed (target speed of the engine)

The invention claimed is:

1. A drive control device for a hybrid vehicle provided with: a differential device which includes a first differential mechanism and a second differential mechanism and which has four rotary elements; and an engine, a first electric motor, a second electric motor and an output rotary member which are respectively connected to said four rotary elements, and wherein one of said four rotary elements is constituted by a rotary component of said first differential mechanism and a rotary component of said second differential mechanism which are selectively connected to each other through a clutch, and one of the rotary components of said first and second differential mechanisms which are selectively connected to each other through said clutch is selectively fixed to a stationary member through a brake, said drive control device: stopping a rotation of the engine by using the clutch or the brake when an engine speed is reduced for making a shift from an engine drive mode in which the engine is driven for running to a motor drive mode;

engaging the clutch or the brake to reduce the engine speed to zero after the first electric motor is used for reducing the engine speed, and the first electric motor providing a feedback control such that the engine speed is reduced toward a target speed set in advance to a value larger than zero.

2. The drive control device according to claim 1, wherein a drive mode is shifted from the engine drive mode in which the brake is placed in an engaged state while the clutch is placed in a released state, to the motor drive mode in which the brake and the clutch are placed in an engaged state.

3. The drive control device according to claim 1, wherein said first differential mechanism is provided with a first rotary element connected to said first electric motor, a second rotary element connected to said engine, and a third rotary element connected to said output rotary member, while said second differential mechanism is provided with a first rotary element connected to said second electric motor, a second rotary element, and a third rotary element, one of the second and third rotary elements of the second differential mechanism being connected to the third rotary element of said first differential mechanism, and wherein said clutch is configured to selectively connect the second rotary element of said first differential mechanism, and the other of the second and third rotary elements of said second differential mechanism which is not connected to the third rotary element of said first differential mechanism, to each other, while said brake is configured to selectively fix the other of the second and third rotary elements of said second differential mechanism which is not connected to the third rotary element of said first differential mechanism, to said stationary member.

* * * * *